May 10, 1966     L. P. HUNTER     3,251,009
SEMICONDUCTOR ULTRASONIC SIGNAL-DELAY APPARATUS UTILIZING
INTEGRAL P-N JUNCTIONS AS ELECTROMECHANICAL TRANSDUCERS
Filed May 28, 1963

INVENTOR
LLOYD P. HUNTER

BY Everett A. Gartrell

ATTORNEY

United States Patent Office 3,251,009
Patented May 10, 1966

3,251,009
SEMICONDUCTOR ULTRASONIC SIGNAL-DELAY APPARATUS UTILIZING INTEGRAL P-N JUNCTIONS AS ELECTROMECHANICAL TRANSDUCERS
Lloyd P. Hunter, Palo Alto, Calif., assignor to International Business Machines Corporation, New York, N.Y., a corporation of New York
Filed May 28, 1963, Ser. No. 283,769
2 Claims. (Cl. 333—30)

The present invention is directed to ultrasonic signal-delay apparatus.

An ultrasonic signal-delay line or apparatus comprises a stress-wave propagating member associated with a pair of spaced electromechanical transducers. An electrical signal applied to the first or input transducer is changed by the latter into a stress wave which is propagated in the member at the speed that sound is translated therein. The second or output transducer receives the propagated stress wave and converts it to an electrical signal which is representative of but is delayed with respect to the applied signal by the time required for the stress wave to travel between the spaced transducers.

Prior to applicant's invention, manufacturers of ultrasonic delay apparatus have unsuccessfully endeavored to solve the difficult problem of mechanically matching the impedance of the transducers to the propagating member so that sound reflections and acoustic losses were minimized. Heretofore, prior electrostrictive transducers were cemented to the propagating member. The cement bonds were small and often proved to be difficult to make. Since the mechanical impedance of the cement was not the same as that of the transducers or the propagating member, reflection problems were created and these became more troublesome when it was required that the apparatus be operated at higher frequencies.

Another problem which was encountered but not satisfactorily overcome in the fabrication of prior ultrasonic signal-delay apparatus was the minimizing of the physical length of individual transducers and the associated portions of the stress-wave propagating member so that the developed stress-wave had a minimum wave length. The solution to this problem is important for those applications wherein it is necessary to obtain a high storage density of information in the apparatus or operate at high frequencies.

It is an object of the invention, therefore, to provide a new and improved ultrasonic signal-delay apparatus which avoids one or more of the above-mentioned disadvantages and limitations or prior such apparatus.

It is another object of the invention to provide a new and improved electrostrictive ultrasonic signal-delay apparatus.

It is a further object of the invention to provide a new and improved ultrasonic signal-delay apparatus which is capable of affording a substantially perfect mechanical impedance match between the transducers and the stress-wave propagating member.

It is a still further object of the present invention to provide a new and improved ultrasonic signal-delay apparatus which has a good frequency response.

In accordance with a particular form of the present invention, an ultrasonic signal-delay apparatus comprises a semiconductor piezoelectric stress-wave propagating member having a pair of spaced PN junction portions, and semiconductor PN junction piezoelectric transducers including those portions and also including means for establishing a depletion layer about each of the aforesaid PN junction portions. The apparatus also includes means coupled to the PN junction portion of one of the transducers for applying an electric wave thereto to develop in the depletion layer thereof a stress wave for propagation by the semiconductor member to the depletion layer in the other of the transducers. The ultrasonic signal-delay apparatus also includes means coupled to the other transducer and responsive to the stress wave in the depletion layer thereof for deriving an output electric wave representative of but delayed with respect to the applied wave by the propagation time of the stress wave in the semiconductor member between the spaced portions thereof.

The foregoing and other objects, features and advantages of the invention will be apparent from the following more particular description of preferred embodiments of the invention, as illustrated in the accompanying drawing.

Figure 1:
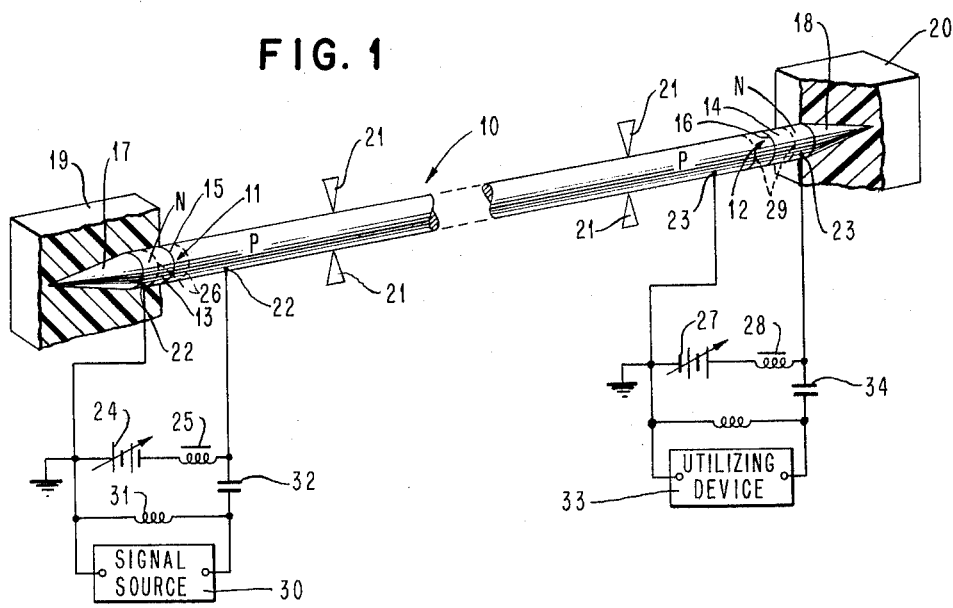
FIG. 1 is a diagrammatic representation, partly schematic, of an ultrasonic signal-delay apparatus in accordance with a particular form of the invention.

*Description of FIG. 1 apparatus*

Referring now to FIG. 1, the ultrasonic signal-delay apparatus there represented comprises a semiconductor piezoelectric stress-wave propagating member 10 having a pair of spaced PN junction portions 11 and 12. Member 10 is a piezoelectric semiconductor material from the group consisting of cadmium sulphide, zinc oxide, cadmium telluride, cadmium selenide, gallium arsenide, indium antimonide, gallium phosphide and indium arsenide, the first four being Group II–IV compounds with the wurtzite structure while the remaining four being Group III-V compounds with the zinc-blend structure. The polarizable semiconductor material gallium arsenide appears to be particularly useful. Accordingly, the member 10 will be considered hereinafter as being made of gallium arsenide. The member 10 may be a poly-crystalline material. However, it is preferable that it be a single crystal having no grain boundaries since the latter increase scattering losses and rapidly attenuate a stress wave that is launched in the crystal.

The geometry of the stress-wave propagating member 10 may vary depending upon the particular requirements of the signal-delay apparatus. For some applications its cross-sectional dimensions may be large with respect to the wave length of the developed stress wave. For other applications the cross-sectional dimensions may be small compared to the wave length of the propagated stress wave. For example, the member may be a long filament of gallium arsenide of circular cross section as represented in FIG. 1, or it may be of rectangular cross section such as the ribbon 40 represented in FIG. 2. For longer time delays, the member 10 may be coiled to conserve space.

The PN junction portions 11 and 12 may be formed adjacent the ends of the member 10 in various manners well-known in the semiconductor art. For example, if the member is a P-type gallium arsenide, N-type regions 13 and 14 may be formed on the ends thereof by epitaxial deposition, or the original P-type ends may be converted to N-type semiconductor material by a diffusion operation. Barrier regions or PN junctions 15 and 16 are formed between the P-type and N-type regions under consideration. It will be understood that the member 10 and the regions 13 and 14 may be of the opposite conductivity types from those indicated in the drawing. It will also be understood that the N-type regions may be piezoelectric semiconductor materials other than gallium arsenide epitaxially grown on the ends of gallium arsenide member 10.

Figure 1A:
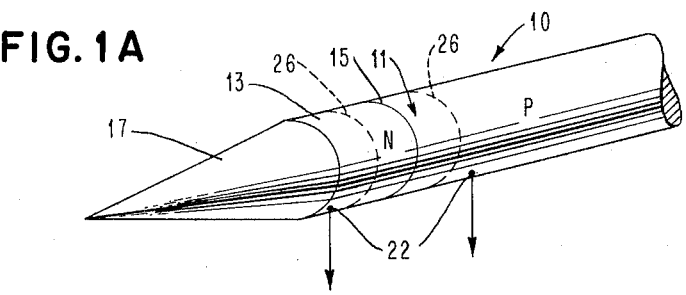
FIG. 1A is an enlarged perspective view of a portion of the apparatus of FIG. 1.

For some applications it may be desirable to employ means at the end portions of the signal-delay apparatus under consideration to reduce reflection effects of stress-waves appearing in those portions. Accordingly, the regions 13 and 14 may include tapered or conical terminations 17 and 18 such as those represented in FIGS. 1 and 1A. Further to reduce undesirable reflection effects, it may be desirable to employ sound-absorbing means such as a pair of blocks 19 and 20 of suitable material such as plastic for confining the conical terminations 17 and 18. These blocks also serve to clamp the stress-wave propagating member 10 to restrain it from movement. When the member 10 is particularly long, it is customary to support it at several points intermediate its ends to prevent movement. This expedient has been represented diagrammatically by supports 21, 21 of a suitable plastic material which usually engage circumferential portions of the member 10.

The ultrasonic signal-delay apparatus also comprises semiconductor PN junction piezoelectric transducers including the spaced PN junction portions 11 and 12 and including means for establishing a depletion layer about each of those portions. This means includes a pair of terminals 22, 22 for PN junction portion 11 and a similar pair of terminals 23, 23 for the other PN junction portion 12. These terminals constitute ohmic contacts to the respective P-type and N-type regions represented in the drawing and are formed by techniques which are well-known in the semiconductor art such as by the depositing or evaporating of metal contacts, alloying, etc. An adjustable voltage source such as battery 24 is connected through a radio-frequency choke coil 25 to the terminals 22, 22 with its positive pole connected to the N-type region 13 so as to bias reversely the junction 15 and establish in the well-known manner a depletion layer, the extremities of which are indicated by the broken lines 26, 26. Similarly, a battery 27 is connected through a choke coil 28 to the terminals 23, 23 to provide another depletion layer that is delineated as existing between the broken lines 29, 29.

This signal-delay apparatus further includes a means coupled to the PN junction portion of one of the transducers for applying an electric wave thereto to develop in the depletion layer thereof a stress wave for propagation by the semiconductor member 10 to the depletion layer in the other of the transducers. This means comprises a signal source 30 which is connected to the input terminals 22, 22 and comprises a pulse generator such as a radio-frequency pulse generator operated at a suitable frequency such as one centered about 100 megacycles. A winding 31 may be employed in conjunction with the generator to provide a pass band of the desired shape, and a capacitor 32 is used to isolate the direct and alternating-current circuits.

The delay apparatus additionally includes means coupled to the other or output transducer and responsive to the stress wave in the depletion layer thereof for deriving an output electric wave which is representative of but is delayed with respect to the electric wave applied to the input terminals 22, 22 by the propagation time of the stress wave in the semiconductor member 10 between the space portions 11 and 12. This means comprises a signal-utilizing device 33 connected to the output terminals 23, 23. Device 33, which is isolated from the biasing circuit including the battery 27 by a blocking capacitor 34, preferably includes suitable amplifiers and means for reshaping the electric wave derived by the transducer associated therewith.

*Explanation of operation of FIG. 1 apparatus*

In regard to the operation of the FIG. 1 apparatus, it will be assumed initially that the reverse bias voltages supplied by the batteries 24 and 27 have been adjusted to control the thickness of the depletion layers associated with the input and output tranducers, thereby establishing the resonant operating frequency of those transducers. This resonant frequency corresponds to a wave length of sound which is of the order of twice the thickness of the depletion layer. Since the thickness of that layer may be kept very thin, being of the order of $10^{-3}$ to $10^{-5}$ centimeters depending upon impurity concentration and the magnitude of the bias voltage, the operating frequency may be in the range of from about 300 megacycles to several thousand megacycles. A higher reverse bias is effective to reduce the operating frequency. A large direct-current electric field established by the battery 24 creates a significant stress, and the depletion layer between the lines 26, 26 is elastically strained, but not the semiconductor bulk of the member 10. A short-duration unidirectional or radio-frequency pulse is applied to terminals 22, 22 by the source 30 and may have a magnitude which is small with respect to the unidirectional bias supply by the battery 24. This pulse is superimposed on the unidirectional bias and creates a voltage drop across the low-resistivity semi-conductor material therebetween, most of which appears across the junction 15. The sudden change in the large electric field in the depletion layer about the junction 15 develops in that layer a stress-wave which is propagated simultaneously toward both ends of the member 10 and to the associated PN junction portions 11 and 12.

Let us consider first the stress-wave that is launched in the longitudinal mode toward the PN junction 16 near the other end of the delay apparatus. Since the geometry and the mechanical properties of the semiconductor stress-wave propagating member 10 are the same as those of the depletion layer about the junction 15, the mechanical impedance of the member 10 perfectly matches that of the depletion layer under consideration. Accordingly, undesired reflections and energy losses are avoided when the stress wave enters the member 10. Furthermore, this exact impedance match is realized at any desired operating frequency of the apparatus including the higher frequencies, which in prior apparatus were particularly troublesome. When the propagated stress wave reaches the depletion-layer transducer associated with the PN junction 15 after a delay determined by the spacing between the two transducers and the translating speed of the stress wave in gallium arsenide, the output transducer associated with the junction 14 derives therefrom for application to the terminals 23, 23 an electrical wave or pulse signal which is representative of the signal applied by the source 30 to the terminals 22, 22. The derived signal is amplified, shaped and utilized in device 33 in a conventional manner. In the absence of grain boundaries in the stress-wave propagating member, the wave propagated therein is translated with reduced scattering losses. Since the output transducer has the same characteristics as the input transducer, it also affords an exact mechanical impedance match with the member 10 and provides benefits which correspond to those mentioned above in connection with the input transducer. The effective lengths of the depletion-layer transducers may be made short in comparison with the bit length so that a high storage density of applied signal information may advantageously be realized.

When the intentionally created stress wave reaches the opposite ends of the signal-delay apparatus, reflection effects ordinarily occur which establish spurious stress waves in the transducers and the propagating member 10. The conical terminations 17 and 18 reduce the intensity of in-phase reflections. Also the sound-absorbing blocks 19 and 20 provide a still further reduction of reflection effects. Improved operation of the apparatus is realized because the dispersed reflections obtained with the conical terminations 17 and 18 reduce the amplitude of the ultrasonic energy which the sound absorbing blocks 19 and 20 are required to absorb at any given time. This reduction is brought about because there is a series of low-intensity reflections from each conical end of the gallium arsenide structure as distinguished from a single high-intensity reflection which would result if blunt or sheared ends were employed.

Figure 2:
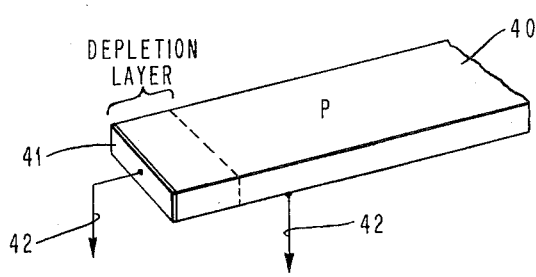
FIG. 2 is a similar representation of a modified portion of that apparatus.

*Description of FIG. 2 structure*

Referring now to FIG. 2 of the drawing, there is represented a portion of a ribbon 40 which serves as a stress-wave propagating member corresponding to the member 10 of FIG. 1. The ribbon has on each end a conductive plating or film 41 of a material which provides a rectifying metal-semiconductor contact. A reverse bias supplied to the connections 42, 43 develops between the film 41 and the connection 43 a depletion layer which serves as the piezoelectrically active region of the transducer. The operation of the structure corresponds to that explained above in connection with the FIG. 1 apparatus.

While the invention has been particularly shown and described with reference to preferred embodiments thereof, it will be understood by those skilled in the art that various changes in form and details may be made therein without departing from the spirit and scope of the invention.

What is claimed is:
1. An ultrasonic signal-delay apparatus comprising:
    a semiconductor piezoelectric stress-wave propagating member having tapered ends and a pair of spaced PN junction portions thereat;
    semiconductor PN junction piezoelectric transducers including said portions and including means for establishing a depletion layer about each of said PN junction portions;
    means coupled to the PN junction portion of one of said transducers for applying an electric wave thereto to develop in the depletion layer thereof a stress wave for propagation by said semiconductor member to the depletion layer in the other of said transducers;
    sound-absorbing means confining said tapered ends for reducing reflection effects of said stress wave at said tapered ends; and
    means coupled to said other transducer and responsive to the stress wave in the depletion layer thereof for deriving an output electric wave representative of but delayed with respect to said applied wave by the propagation time of said stress wave in said semiconductor member between said spaced portions thereof.

2. An ultrasonic signal-delay apparatus comprising:
    a single crystal semiconductor piezoelectric stress-wave propagating member including an elongated region of one conductivity type and a pair of spaced shorter regions of the opposite conductivity type said pair having tapered ends and being contiguous with said first-mentioned region and defining therewith a pair of spaced PN junction portions;
    semiconductor PN junction piezoelectric transducers including said portions and including means for reversely biasing said junction portions to establish a depletion layer about each of said PN junction portions;
    pulse generating means coupled to the PN junction portion of one of said transducers for applying an electric wave thereto to develop in the depletion layer thereof a stress wave for propagation by said semiconductor member to the depletion layer in the other of said transducers;
    sound-absorbing means confining said tapered ends for reducing reflection effects of said stress wave at said tapered ends; and
    means coupled to said other transducer and responsive to the stress wave in the depletion layer thereof for deriving an output electric wave representative of but delayed with respect to said applied wave by the propagation time of said stress wave in said semiconductor member between said spaced portions thereof.

References Cited by the Examiner

UNITED STATES PATENTS

| 2,553,491 | 5/1951 | Shockley | 171—330 |
| 3,093,758 | 6/1963 | White | 310—8 |
| 3,132,257 | 5/1964 | Yando | 307—88 |
| 3,185,935 | 5/1965 | White | 333—30 |
| 3,185,942 | 5/1965 | White | 333—30 |
| 3,200,354 | 8/1965 | White | 333—30 |

OTHER REFERENCES

IRE International Convention Record, vol. 9, part 6, 1961, pages 304–309.

HERMAN KARL SAALBACH, *Primary Examiner.*

C. BARAFF, *Assistant Examiner.*